United States Patent
Yaffe et al.

(10) Patent No.: US 12,002,127 B2
(45) Date of Patent: Jun. 4, 2024

(54) ROBUST SELECTIVE IMAGE, VIDEO, AND AUDIO CONTENT AUTHENTICATION

(71) Applicant: SAMSUNG ELECTRONICS CO., LTD., Suwon-si (KR)

(72) Inventors: Yoel Yaffe, Modiin (IL); Ariel Orfaig, Kfar Ben-Nunn (IL); Gershi Koltun, Givat Ada (IL); Amit Eisenberg, Kiryat Ono (IL); Ishay Goldin, Tel Aviv (IL); Shai Litvak, Beit Hashmonaee (IL)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 680 days.

(21) Appl. No.: 16/924,849

(22) Filed: Jul. 9, 2020

(65) Prior Publication Data

US 2021/0287322 A1    Sep. 16, 2021

Related U.S. Application Data

(60) Provisional application No. 62/987,465, filed on Mar. 10, 2020.

(51) Int. Cl.
*G06T 1/00* (2006.01)
*H04L 9/32* (2006.01)

(52) U.S. Cl.
CPC .......... *G06T 1/0042* (2013.01); *G06T 1/0028* (2013.01); *H04L 9/3242* (2013.01); *G06T 2201/0052* (2013.01); *G06T 2201/0065* (2013.01)

(58) Field of Classification Search
CPC .......... G06T 1/0028; G06T 1/0042; G06T 2201/0052; G06T 2201/0065; H04L 9/3242

See application file for complete search history.

(56) References Cited

U.S. PATENT DOCUMENTS

| | | | |
|---|---|---|---|
| 7,360,093 B2 | 4/2008 | de Queiroz | |
| 8,947,547 B1* | 2/2015 | Millikan | H04N 23/10 348/211.8 |
| 2005/0177726 A1* | 8/2005 | Alasia | H04N 19/196 713/176 |
| 2005/0228753 A1* | 10/2005 | Viger | H04L 63/10 707/E17.031 |

(Continued)

FOREIGN PATENT DOCUMENTS

EP    0845758    3/2003

OTHER PUBLICATIONS

Assa Naveh, et al. "Photoproof: Cryptographic Image Authentication for Any Sets of Permissible Transformation," IEEE Symposium on Security and Privacy, 2016, pp. 225-271.

*Primary Examiner* — Jeremy S Duffield
(74) *Attorney, Agent, or Firm* — F. CHAU & ASSOCIATES, LLC

(57) ABSTRACT

A method for processing a digital content includes acquiring content data using a sensor. Compressed reference data is generated from the acquired content data. A hash of the compressed reference data is generated using a hashing function. The generated hash is signed using an encryption function. The acquired content data is transmitted along with the compressed reference data and the signed hash.

9 Claims, 7 Drawing Sheets

(56) References Cited

U.S. PATENT DOCUMENTS

| | | | | |
|---|---|---|---|---|
| 2006/0036864 A1* | 2/2006 | Parulski | ............... | H04L 9/3247 |
| | | | | 713/176 |
| 2006/0092291 A1* | 5/2006 | Bodie | ............... | H04N 1/32112 |
| | | | | 348/231.99 |
| 2010/0046748 A1* | 2/2010 | Kusnoto | ............ | G06F 21/6209 |
| | | | | 380/42 |
| 2011/0082797 A1* | 4/2011 | Glachant | ............... | H04L 9/3297 |
| | | | | 705/13 |
| 2011/0187741 A1* | 8/2011 | Akiya | .................... | G09B 29/10 |
| | | | | 345/625 |
| 2019/0104251 A1* | 4/2019 | Otsuki | ................ | H04L 9/3247 |
| 2019/0108665 A1* | 4/2019 | Williams | ............ | H04N 19/119 |
| 2019/0123911 A1* | 4/2019 | Riley | .................... | H04L 9/3236 |
| 2019/0349204 A1* | 11/2019 | Enke | .................... | G06F 21/602 |

* cited by examiner

# ROBUST SELECTIVE IMAGE, VIDEO, AND AUDIO CONTENT AUTHENTICATION

CROSS-REFERENCE TO RELATED APPLICATION

The present application is based on provisional application Ser. No. 62/987,465, filed Mar. 10, 2020, the entire contents of which are herein incorporated by reference

TECHNICAL FIELD

The present disclosure relates to content authentication and, more specifically, to a system and method for selective image, video, and audio content authentication.

DISCUSSION OF THE RELATED ART

Today still images, video images, and audio content can be generated that appear to have been captured from a human subject but are actually created by a computer without a subject. Still images, video images, and audio contend that was originally captured from a human subject may also be edited to any desired result without apparent signs of having been edited. It is therefore virtually impossible to distinguish content that has been captured from a human subject and then not significantly edited (which may be referred to herein as "authentic" content) from content that was either synthetically generated or first captured from a human subject and then significantly edited (which may be referred to herein as "inauthentic" content).

While it may be fairly common to use computers to either automatically or manually enhance such content for the purpose of making the content more indicative of the scene or subject being captured, or more aesthetically pleasing (content that has been so-edited may still be considered "authentic"), a problem of particular concern is when content may be synthetically generated or edited for the purpose of deceiving the viewer and/or embarrassing the subject. Such content may be known as "deepfakes."

While various methods exist to attempt to determine if content is authentic or inauthentic, as defined herein, methods are then developed to generate inauthentic content in such a way as to fool the existing methods for testing the content, and in this way, generating inauthentic content that are indistinguishable from authentic content. Therefore, determining if content is authentic becomes a game of cat and mouse.

One such approach for authenticating an image relies upon looking for a camera "fingerprint" within an image, where this fingerprint is some artifact of the sensor from which the image was captured with. However, artificial intelligence has been developed to add a convincing camera fingerprint to computer synthesized images so as to make them appear to have been captured by an image sensor when in fact they were not.

Another approach for authenticating an image relies upon generating a digital signature for an image so that any modification of that image at all will lead to a mismatch between the signature and the resulting image, thereby showing that the image has been manipulated. These approaches may be known as strict content authentication. However, this is not a practical solution because in order to make good use out of an image, certain modifications may need to be performed such as cropping, compressing, and adjustments to brightness, contrast, etc.

SUMMARY

A method for processing a digital image includes acquiring image data using an image sensor. Compressed reference data is generated from the acquired image data. A hash of the compressed reference data is generated using a hashing function. The generated hash is signed using an encryption function. The acquired image data is transmitted along with the compressed reference data and the signed hash.

A method for processing a digital image includes acquiring image data using an image sensor. The acquired image data is split into a matrix of sub-images. Compressed reference data is generated from each of the sub-images. A hash of each of the compressed reference data is generated using a hashing function. Each of the generated hash is signed using an encryption function. The acquired image data is transmitted as the matrix of sub-images along with the compressed reference data and the signed hashes.

A method for processing a digital content, includes acquiring content data using a sensor. The acquired content is divided into a plurality of frames. Compressed reference content is generated for each of the plurality of frames. A hash of the compressed reference content is generated for each of the plurality of frames using a hashing function. Each of the generated hashes is signed using an encryption function. The acquired content data is transmitted along with the compressed reference data and the signed hashes.

A method for processing a digital image includes acquiring image data using an image sensor. A compressed reference data is generated from the acquired image data. The compressed reference data is signed using an encryption function. The acquired image data is transmitted along with the signed encrypted compressed reference data.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
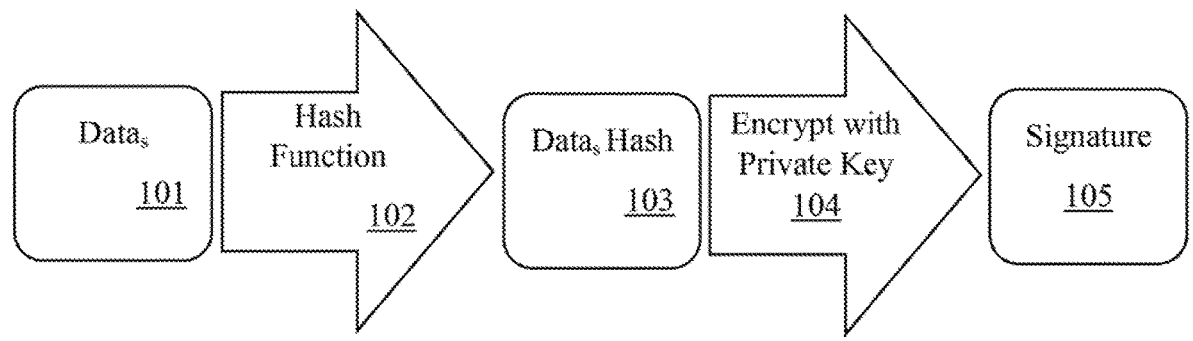
FIG. 1 is a flow diagram illustrating a process for generating and authenticating digital image data in accordance with exemplary embodiments of the present disclosure.
Figure 1:
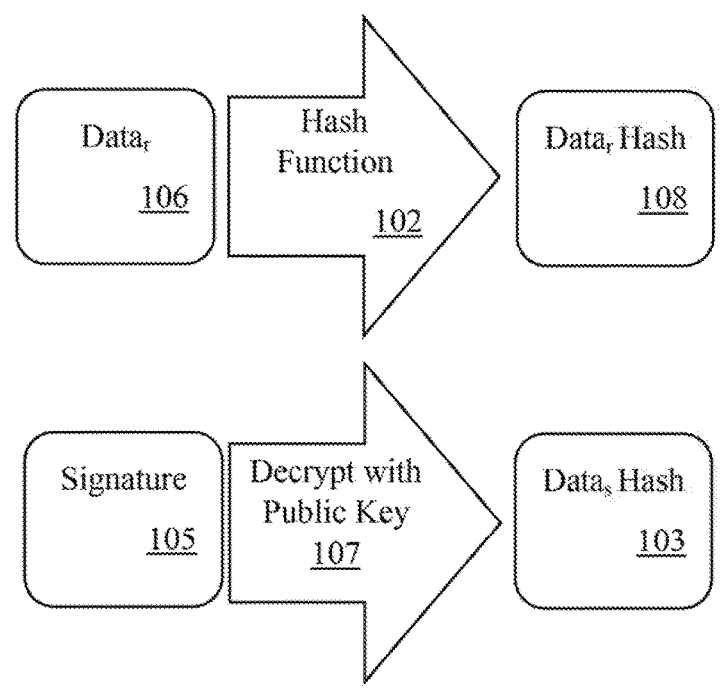

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present disclosure relate to systems and methods for content authentication in which authenticity of the content, be it a still image, a video image, or audio content, is assured even while the original content can be edited so as to be optimized or otherwise enhanced without breaking the authentication. Exemplary embodiments may be described herein in terms of a still image, however, it is to be understood that the hardware and techniques described herein may be modified for use in video and audio without departing from the scope of the present disclosure. This may be achieved by adapting a sensor, such as a charge-coupled device (CCD) sensor or a complementary metal-oxide-semiconductor (CMOS) sensor, so as to generate compressed reference data for the image (may be considered an "image reference"), at the time of image acquisition, and then hash and sign the compressed reference data using a private key maintained by the sensor. The hashed and signed compressed reference data may then be attached to the file of the original image (which may be referred to herein as a "primary image"). As the primary image is subsequently modified, the signed compressed reference data stays unmodified and so this signed compressed reference data may be used, at any point, to validate the authenticity of the primary image, either by a person examining the reference data to see if it materially departs from what is shown in the primary image, or by an algorithm that is designed to authenticate the primary image from the reference data. The hashed and signed compressed reference data may, for example, be stored within the primary image as metadata.

For example, where the JPEG file format is used to store the acquired image data, the JPEG format allows for the storage of a thumbnail image within the JPEG image, as metadata. The aforementioned compressed reference data may be stored in a manner similar to the thumbnail image and additional metadata within the primary JPEG image may be used to store the signed hash of this thumbnail and so, even as the primary image is modified, the compressed reference data and associated signed hash may remain the same for purposes of authenticating the primary image by comparing the reference data to the primary image at a later point.

In the case of a video file, compressed reference data may be generated and signed as each image frame of the video image is acquired. In addition, the signature of the previous frame in the sequence and a frame counter may be attached as a footer to the reference data of the current frame and hashed together. Thus securing the sequence of reference data and the video. In the case of an audio recording, a compressed reference audio may be generated at the digital signal processor used to perform the recording. Similarly, the past audio frame signature as well as audio frame number may be appended as a footer to the reference data to the current audio frame and hashed together. The compressed reference audio may utilize a reduced bitrate, a reduced sampling frequency, and/or any other known technique for audio compression, and then this compressed reference audio may be hashed and signed, with the signed hash then being added, along with the compressed reference audio, to the primary audio file.

In this way, digital image data acquired by a digital camera device may be stored along with the compressed reference data and the signed hash. Within the digital camera device, for example, where the RAW image data is processed, the compressed reference data may be generated and the hash may be digitally signed so as to prevent tampering. The primary digital image data may be cropped, corrected, noise-reduced, retouched, enhanced, etc. as the compressed reference data stays unedited. The primary digital image, so edited, may be used in a website, a news article, or otherwise disseminated. and the compressed reference data along with the signed hash may be kept accessible so that in the event that the authenticity of the image is in need of verification, the signed hash may be used to verify that the compressed reference data has not been altered and then the compressed reference data may be consulted, either manually or algorithmically, to determine if what is shown in the primary digital image data is sufficiently similar to the compressed reference data to establish the authenticity of the primary digital image data.

FIG. 1 is a flow diagram illustrating a process for generating and authenticating digital image data in accordance with exemplary embodiments of the present disclosure. As discussed above, this process involves digitally signing a hash of the compressed reference data. Here, the compressed reference data may be represented as $Data_s$ 101. Then, as can be seen from FIG. 1, the compressed reference data $Data_s$ 101 is hashed using a hash function 102 to produce the $Data_s$ Hash 103. The $Data_s$ Hash 103 may then be encrypted using a private key 104 that is known only to the digital camera device so as to generate the signed hash, which may be referred to herein as the signature 105. The compressed reference data $Data_s$ 101, along with the primary digital image, and the signature 105, may then be sent across an unsecured environment until it is received by a recipient.

Upon being received, the compressed reference data (now known as $Data_r$ 106) is hashed by the recipient using the same hashing function 102 so as to produce the $Data_r$ Hash 108. The received signature 105 is then decrypted, by the receiver, using a public key 107 so as to reproduce the $Data_s$ Hash 103. The $Data_r$ Hash 108 may then be compared with the reproduced $Data_s$ Hash 103. If they are identical then the integrity of the compressed reference data $Data_r$ 106 is assured and the compressed reference data $Data_r$ 106 may be viewed or otherwise analyzed to determine the authenticity of the primary digital image. The private key, which is known only to the digital camera device, and the public key, which is publicly known, may be part of a public key infrastructure (PKI).

According to this digital signature approach, only the hash, which is relatively small in data size as compared with the reference data, is encrypted with the private key and that the reference data may be viewed without decryption. However, according to an alternative approach, the entire reference data is encrypted with a private key instead of creating hash and encrypting that hash. According to this approach, the reference data may be kept secret.

As an alternative to encrypting the compressed reference data, the above encryption/decryption approach may be used to encrypt/sign the entire primary digital image so as to ensure strict content authentication, where desired. Moreover, as an alternative to using the aforementioned PKI, a symmetric key infrastructure may be used on which encryption and decryption are performed with the same private key.

As discussed above, signing may be performed within the digital camera device, for example, signing may be performed within the sensor hardware, which may be a charge coupled device CCD, a complementary metal-oxide-semiconductor CMOS sensor, or some other known sensor arrangement. By signing the data on the sensor hardware, high confidence in the validity of the data as a real world captured information may be ensured. Tampering with or otherwise modifying the data within the sensor may be hard due to physical difficulties as the sensor will typically process data using hardwired hardware, on the fly, without passing through memory. In cases where some software is applied within the sensor, this software may be deeply embedded to the image sensor and might not be part of the digital camera device's operating system. Once the data is transferred from the sensor component to the processing system, is it much less secure since the processing platform may run user applications, which have the potential to be malicious, and may be connected to the Internet and therefore subject to different cyber security attacks.

The sensor may alternatively be, or additionally include a microphone. The microphone may acquire sound and convert the sound into an electrical signal that may then be digitized. The microphone may either be a standalone sensor or may be associated with an image sensor to acquire audio data along with video data. The microphone may be interfaced to the image sensor, for example, using an inter-IC sound ($I^2S$) interface.

Figure 2:
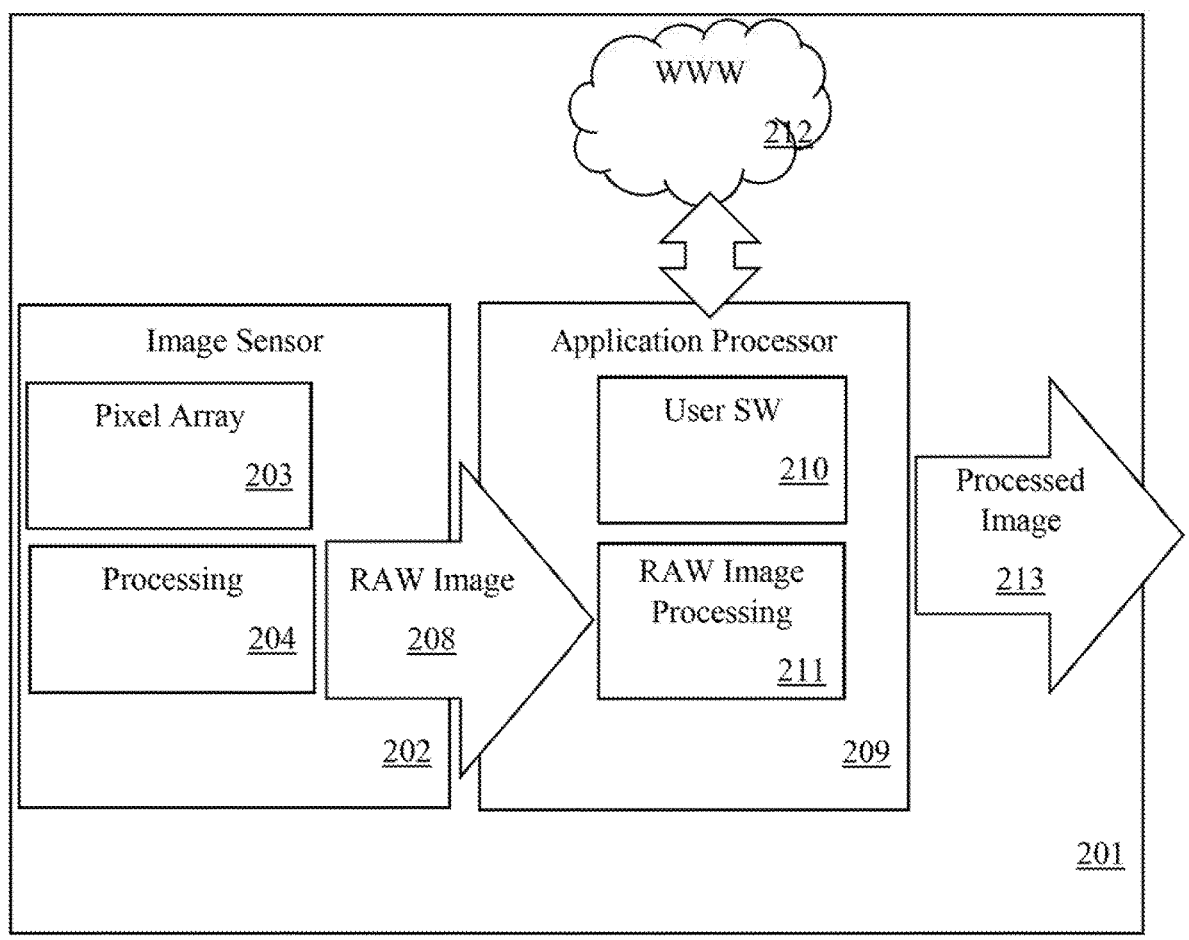
FIG. 2 is a schematic diagram illustrating a comparative camera architecture.
Figure 3:
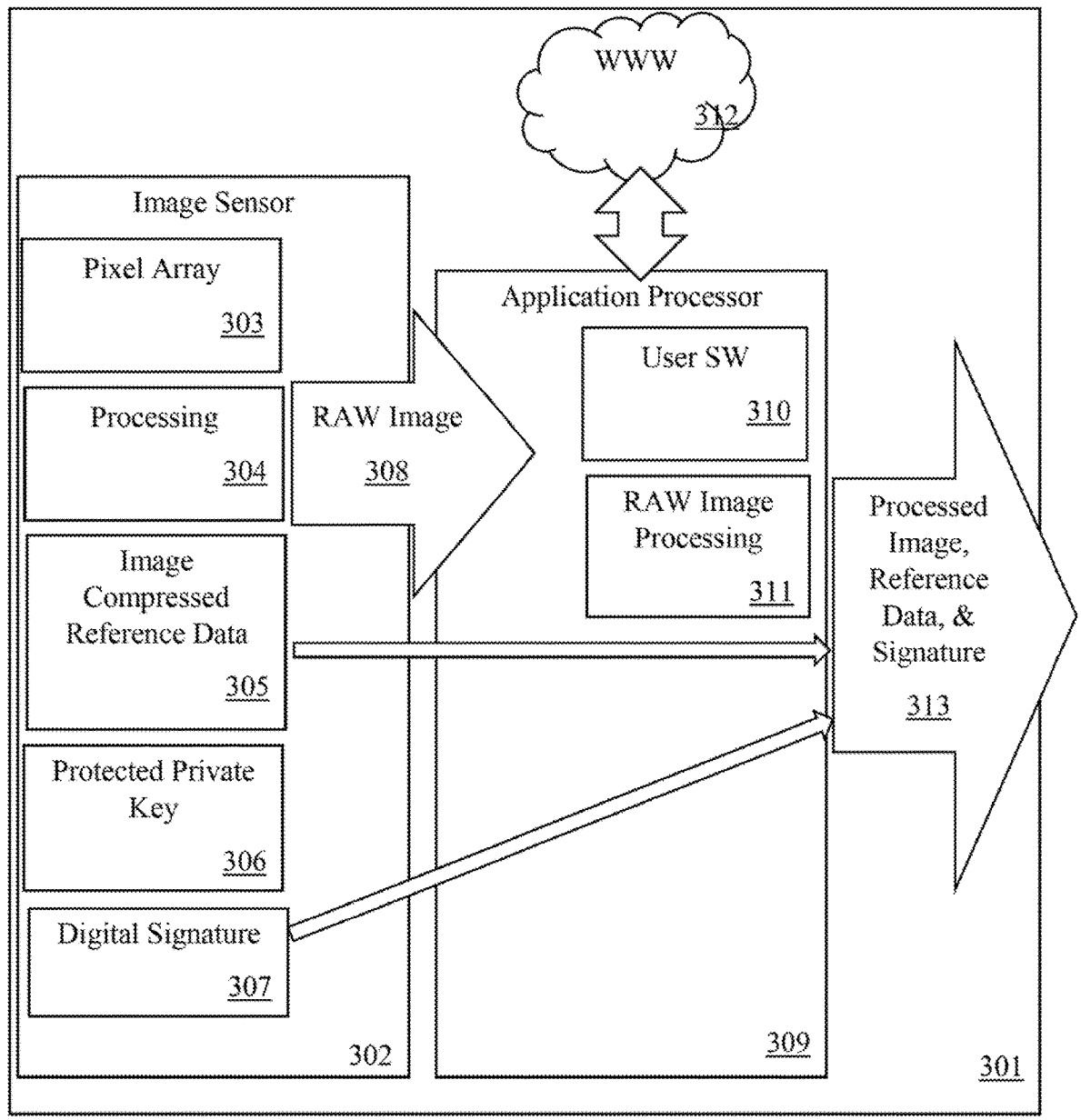
FIG. 3 is a schematic diagram illustrating a camera architecture for permitting image authentication in accordance with exemplary embodiments of the present disclosure.

Accordingly, exemplary embodiments of the present disclosure provide a camera architecture for performing the aforementioned encryption. FIG. 2 is a schematic diagram illustrating a comparative camera architecture. FIG. 3 is a schematic diagram illustrating a camera architecture for permitting image authentication in accordance with exemplary embodiments of the present disclosure. In the comparative camera architecture, the digital camera device 201 includes an image sensor 202, which may be a CCD or CMOS image sensor, which is primarily configured to acquire digital image data. The digital camera device 201 may also include an application processor 209, which is primarily configured to take the RAW image data captured from the image sensor 202 and convert it into a processed image 213 in accordance with user software 210. The application processor 209, and the user software 210 that runs thereon, may be connected to the Internet 212 though a WiFi module (or a cellular data connection, especially where the digital camera device 201 is part of a mobile phone) and may also be connected to various other hardware elements such as a global positioning system (GPS) and/or other environmental sensing elements. The software 210 may add to the processed image 213 various metadata, which may include image information such as camera ID, exposure time, ISO, image frame number, etc.

The image sensor 202 may include a pixel array 203, which senses light information and digitizes this light information using an analogue-to-digital converter (ADC). The image sensor 202 may further include a timing control circuits used to accomplish real world image capturing. The captured representation may be 2D, 3D, RGB, hyperspectral or any other real-world information. A processing and encoding component 204 may be included to prepare standard format such as 2D RAW BAYER format image. Such RAW image data 208 typically undergoes further processing in the digital camera device 201 by the application processor 209.

It is to be understood that the digital camera device 201 additionally includes various other hardware typical of a digital camera device, such as lens hardware, body hardware, memory card adapter, display element, etc. but for the purpose of providing a simplified explanation, this and other hardware not directly related to the data path may be omitted from the figures and explanation thereof.

In FIG. 3, the digital camera device 301 configured for permitting image authentication, in accordance with exemplary embodiments of the present disclosure, may still include an image sensor 302 and an application processor 309. The application processor 309 may be substantially the same as the application processor 209 described above, and may include an image processor 311 and user software 310 running thereon. The application processor 309 may be connected to the Internet 312, for example, using a WiFi module, and the user may be able to install applications into the user software 310. As such, the ability to compromise data integrity may be higher within the application processor 309 than within the image sensor 302 so that one or more data security elements may be incorporated into the image sensor 302.

The image sensor 302 may be a singular integrated circuit and the various components described herein may be elements of that singular integrated circuit. The digital camera device 301 may be configured to support on-sensor selective signature, which may be an adaptation of the sensor architecture 201 as presented in FIG. 2. The instant image sensor 302 may be similar to the prior described image sensor 202, insofar as it includes a pixel array 303 and a processing unit 304, with the addition of various other elements. For example, an additional image processing component 305 may compress and encode the aforementioned compressed reference data. The additional image processing component 305 may include: (1) incremental image processing or alternative image processing (providing alternative image processing to the imager processing provided by the processing unit 304) such as downscaling and sharpening or feature extraction, and (2) data compression such as according to JPEG. It is noted that this image processing is not related to the processing of the image processing module 311 as the image processing module 311 is involved with the data path for the primary image data while the processing of the additional image processing component 305 is part of a selective signature data path.

For example, this processing or feature extraction and compression component 305 may implement generation of the compressed reference data from the RAW image data 308 captured from the pixel array 303 or from intermediate result of processing component 304 captured from the pixel array 303 or directly from the pixel array 303, for example, by downscaling, sharpening, denoising, color correction or extracting features by classical or artificial intelligence (AI) methods and then compress the data by compression method such as JPEG compression, etc. This component 305 may also be responsible for performing some amount of sharpening, downscaling, compression, etc. either in addition to or in accordance with the RAW image processing module 311 of the application processor 309. However, it is noted that component 305 is not actually involved in processing the RAW primary image, which may be performed by component 311. While component 305 may use some elements that are similar to image signal processing, feature extraction and JPEG compression, component 305 maximizes the ability to detect image authentication later on, either manually or by algorithm.

It is noted that while the generation of the reference data, the protected private key, and the digital signature may be performed within the image sensor, where this is not an option, these steps may be performed by other hardware or a trusted software zone.

The compressed reference data generated by this element 305 may then be hashed and encoded by a securely stored sensor private key 306 and a digital signature component

307. Both the compressed reference data 305 and the signed hash/digital signature 307 are added to the processed image data 313, circumventing the application processor 309. The RAW image data 308 may be passed to the application processor 309 for RAW image processing that may include demosaicing, denoising, color correction, and an optional image compression or video compression. It is noted that where the image processing of the application processor 309 downscales and/or compresses the raw image data 308, the compressed reference data that is generated within the image sensor 302 and hashed/signed therein may have a smaller file size than that of the JPEG image (or other image encoding scheme such as RGB or YUV) generated by the application processor 309 and so the compressed reference data may have a lower resolution and/or a higher degree of compression than both the RAW image data and the JPEG image generated by the application processor 309. However, in some cases, the reference data may actually be larger than the JPEG image, for example, where the JPEG image is significantly cropped.

The image sensor 302 attaches the compressed reference data and the signed hash as-is directly to the image data and the application processor 309 makes no changes thereto. The primary digital image, which is generated by the image processor 311 based on the RAW image data 308, may undergo further changes freely on the application processor or on the Internet 312. For example, after being output to users in 313, 311 may undergo further changes by user applications such as a messaging app or image editing software while the included compressed reference data and signature remain unchanged and attached to the changed 311.

Both the compressed reference data and the signed hash are attached as-is may be included as additional metadata in the related image JPEG file that comprises the primary digital image. Where the limitations of the file format used (e.g. JPEG) limit the size of the compressed reference data to a thumbnail of, for example, 64 KB, the compressed reference data may be limited to that size. Where it is desired that the compressed reference data be of a size that is greater than what may be allowed by the limitations of the file format being used, the digital image data may be divided into several blocks, with each block including a segment of the primary digital image and a corresponding segment of the compressed reference data that abides by the file formal limitations on metadata. As an option, a separate signed hash may be prepared for each image segment. Thus, this approach may be contemplated as dividing the digital image data into a group of sections that may each be separately authenticated with its own corresponding signed hash, provided that the manner in which the various image segments are to be reassembled is maintained.

Moreover, where the image is so-divided, the correct ordering of the image blocks may be assured by appending the signature of a prior block to a subsequent block. Alternatively, counters may be associated with the image blocks to accord to the correct order. These counters may be added in the image reference metadata naming convention and the signature will be the same and checked vs the appended information.

Further any special markers should be avoided by the Image processing component 305 and digital signature component 307 from being included in the generated data by known means. The compressed reference data output and signed hash output will be referred to jointly as signed reference data and this signed reference data, in combination with the primary digital image, may comprise the digital image data.

The signed reference data may either be used, on its own, to verify the authenticity of an image, or it may be beginning (i.e. root) of a chain of trust in which there is a series of trusted data with digital signatures that are nested within one another such that each additional data includes the previous signature. This chain of trust may be used to strengthen confidence in the authenticity of an image as an actual capture of a real scene and not some illusion in the real world such as image of a fake photograph or TV screen. This may be accomplished by including data from one or more other sensors such as hyperspectral image, 3D map, and/or GPS. Secured time signatures may be included to indicate all information was acquired/combined at the same time.

Further, the chain of trust may be used to allow an image authentication service to evaluate the authenticity of an image and then sign the image with the results of their evaluation and add a digital signature of the final image or yet another reference data so as to show what image had been authenticated. According to this approach, the authenticity of the primary digital image may be evaluated by the authentication service, using the compressed reference data and the signed hash, and then a new compressed reference data having its own signed hash may be added to the digital image data to show that its authenticity had been authenticated by the authentication service.

In this way, a user may be able to get a good idea of the authenticity of the primary digital image without having to call an image authentication service at that moment or otherwise having to visually check the compressed reference data against the primary digital image.

Figure 4:
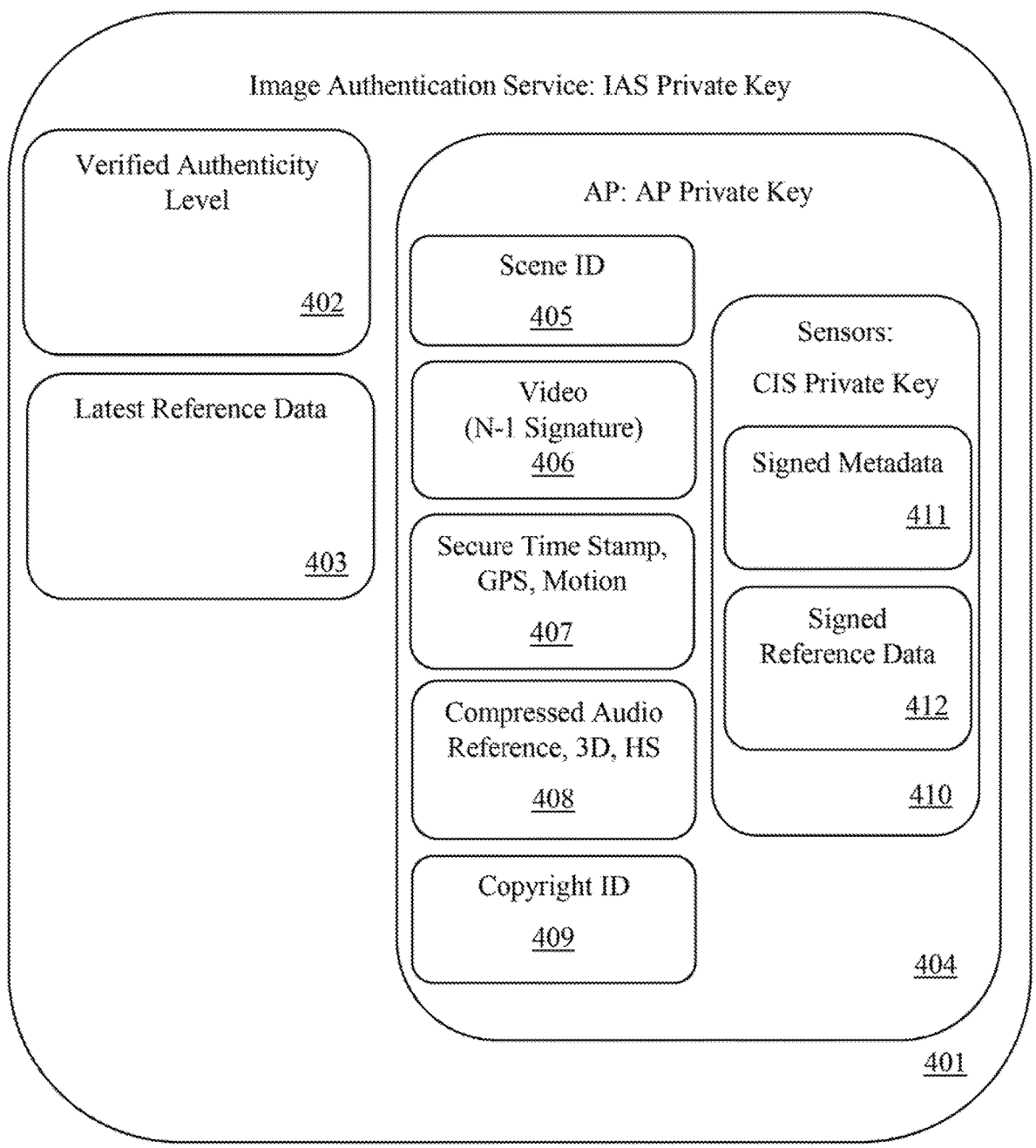
FIG. 4 is a diagram illustrating an example of a chained trusted package in accordance with exemplary embodiments of the present invention.

FIG. 4 is a diagram illustrating an example of a chained trusted package in accordance with exemplary embodiments of the present invention. As shown here, at the first level 410, the signed reference data 412 (e.g. image downscaled thumbnails compressed by JPEG) is stored along with metadata 411 (e.g. time stamp, scene ID, video N−1 signature, etc.) and signed together by the sensors to produce the validation signature. As there may be one or more sensors used to capture images, the signed metadata 411 may include a Scene ID, which may be used to keep track of which images from which sensors correspond to a single scene. For example, where an image is captured with stereo vision, the left-eye image and the right-eye image may both share the same scene ID. The signed metadata may also include optional scene configuration description (stereo imaging) and sensor type (left or right), etc. Where it is a video being authenticated, each image frame may be signed and may also include the signature of the prior frame (the N−1 signature). The scene ID may be managed by the AP, for example, by configuration of dedicated registers or memory on the sensor for signing by the sensor or for AP level signing as part of a chain of trust.

It was described above that only the sensor would sign the image, however, within the chained trusted package, a second level of signing 404 may occur at the AP level. As the scene IDs are managed at the AP level, here the scene IDs may be included 405 along with the N−1 signature for video 406, additional metadata elements such as secure time stamps, GPS coordinates, motion (e.g. captured by accelerometers and other such sensors) 407, compressed audio reference, 3D data, HS data, etc. 408, and copyright information 409.

In this way, additional meta data may be attached to the reference data before signing and may thereafter be signed along with the reference data. Examples of signed metadata may include a random or sequential scene ID configured by the AP and assigned to multiple sensors so later the scene ID may be referenced to each other as in the case of multiple cameras or a single camera with multiple sensors including image cameras, 3D cameras, hyperspectral cameras and audio. Then references from all cameras or sensors will have the same scene ID and may be securely considered as bundle of images captured at the same time.

Additionally, the signature of previous frame (i.e. the N−1 frame) may be included within the signing of the current frame so frames may be related to each other in sequence.

Then, at the next level, which may be prepared by the image authentication service, 401, a verified authenticity level 402 may be included, providing whether a qualitative determination of authenticity (e.g. authentic or inauthentic) or a qualitative level of authentication. The latest reference data 403 may also be included so as to establish which picture it is that has been authenticated so that any subsequent edits to the picture need not break authenticity.

In the above chaining method, all information described above may be stored within the image file. As an alternative, this information may be stored in a database that is made available over the Internet or stored as a blockchain.

Blockchains may be used to provide an additional level of protection and will allow checking the keys and authenticating only when submitting to the blockchain. Thus, all images may be chained and entries in the block chain may start from the original primary digital image along with the signed reference data generated from the sensor(s) and may continue to show all changes made to the image along with subsequent authentication service results.

As mentioned above, to authenticate video, the previous image frame signature may be included in the current frame data and signature either by AP or by the sensor based on internally stored signature. The option in which it is the AP manages this frame data is described above with reference to FIG. 4, but it is to be understood that this may be managed at the sensor level.

By including the N−1 signature, each frame may be authenticated by itself and the unaltered sequence of frames may also be verified, so as to authenticate against a video file being altered by the rearrangement of frames. For this purpose, a frame counter may be signed as well so as to authenticate against truncation.

It is understood that in some instances of video image enhancement, multiple images may be fused to enhance image quality such as in the case of high dynamic range (HDR) or noise reduction algorithms. The processing SW may preserve one, a few, or all the signed reference data signatures in fusing multiple images to allow all information to be available for the image authentication process.

Further information related to the nature of single or multiple frame processing of the image may be provided by the image processing SW in a form of metadata for use by the image authentication process for increasing a quantitative authentication score, which may otherwise be reduced as a result of major image processing or image deformation as in crop or warping operations, etc. This data is considered as part of the real image and need not require signature.

Exemplary embodiments of the present invention may be used to authenticate an image that has been generated according to the above-described approach, particularly, where that image is received over the Internet. The authentication process for an image received by a user over the Internet may be as follows:

The signed reference data may either include a human-recognizable reference data, such as the JPEG thumbnail discussed above, or may be computer-readable data that is not readily recognizable to a human. In the case where the signed reference data is human-readable, the signed reference data may be identified as fully authentic by checking its appearance of the signed reference data against that of the primary digital image. Then the user, looking at both images, may decide whether the substance of the image was altered to an extent that would be considered inauthentic.

As an alternative to human comparison, a comparison algorithm may be used which compares the signed reference data against the primary digital image and then assigns either an overall score of authenticity or a heat map of authenticity level and indicating the location of suspected change. The comparison algorithm may be simple such as normalization of both images and then comparison by a similarity function or a more complex semantic algorithm.

Different methods may be applied for comparing the signed reference data and the primary digital image. Each method may vary in its quality of authentication. Different methods may be combined to give a better authenticity confidence level. Further, these methods may be combined with known single frame-based authenticity checks.

In the case in which multiple signed reference images are included in the signed reference image due to fusion, an image authentication algorithm may combine the frames to create a better reference image or merge comparison results of each reference image with the full image.

Where the authenticity of a video sequence is being authenticated, the authentication engine may check both frame-by-frame authenticity as well as frame sequence, according to the included past frame signatures which should match (e.g. the signed N−1 frame of the current frame should match the signed frame of the prior frame).

Figure 5:
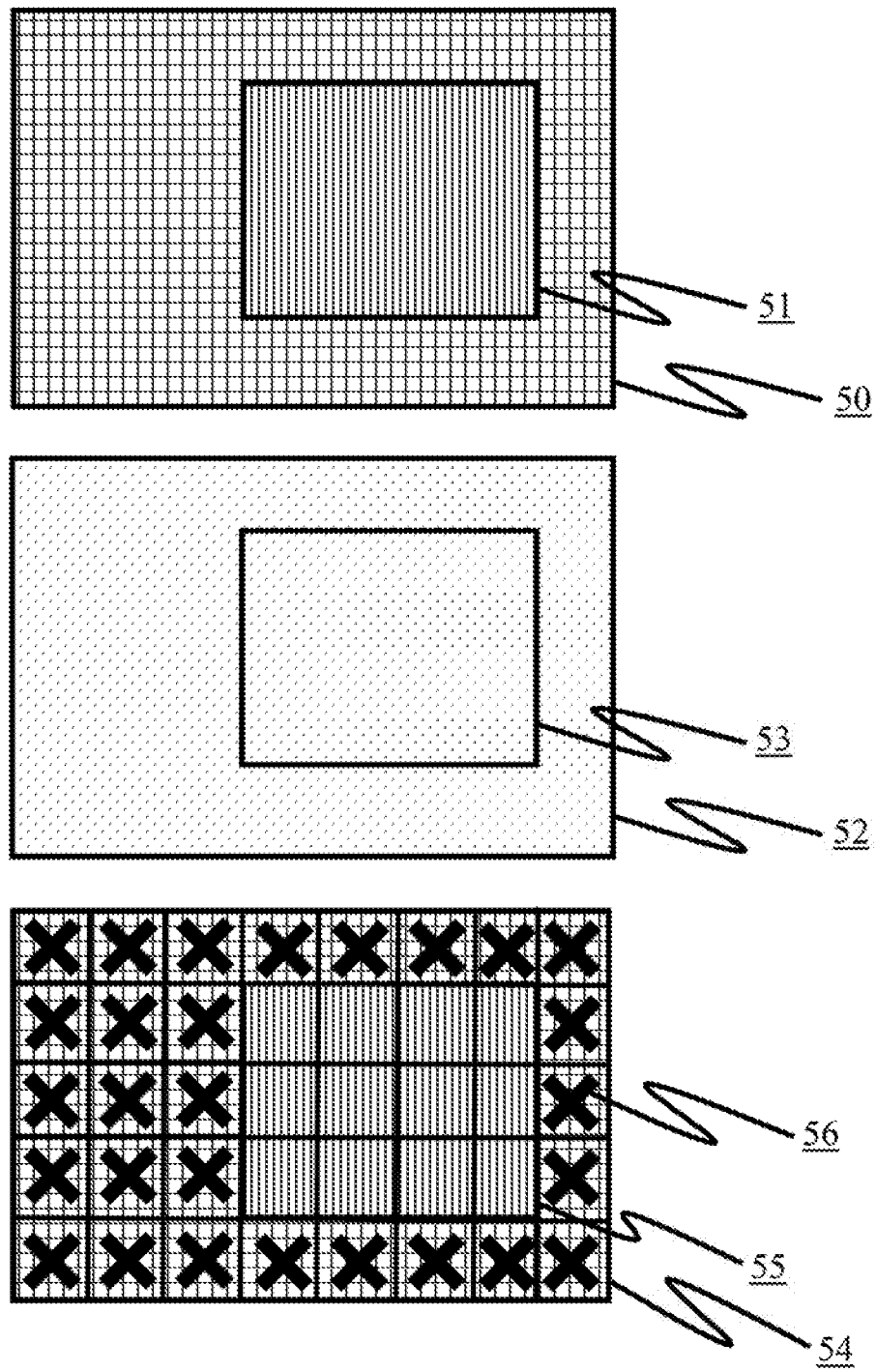
FIG. 5 is a diagram illustrating an approach for authenticating images with redacted content in accordance with exemplary embodiments of the present disclosure.

It is understood, however, that on occasion, an image may be intentionally altered by redacting portions of the image so as to intentionally obscure or remove sensitive imagery. In such cases, the compressed reference data may inadvertently reveal that image data that has been intentionally redacted. Exemplary embodiments of the present disclosure are configured to allow for this selective removal or obscuring of image elements without preventing authentication and without inadvertently revealing the redacted elements within the compressed reference data. FIG. 5 is a diagram illustrating an approach for authenticating images with redacted content in accordance with exemplary embodiments of the present disclosure.

As shown in FIG. 5, an image 50 may include sensitive imagery and so may be cropped so as to provide a cropped image 51 that is suitable for public dissemination. According to one approach for securing the authenticity of such an image, the entire compressed reference data 52 is encrypted using a public key. In this way, the compressed reference data is not available for public view except by authorized agents such as Image Authentication Service which has in possession the matching private key for decryption. The same may be accomplished by a shared secret symmetric key. Here, the primary digital image is cropped 53 while the compressed reference data encompasses the full image 52 but is encrypted against public viewing.

According to another, similar approach, the compressed image reference is not human readable and may be used only for authentication (as computer vision features or neural nets internal reduced representations) which do not allow image display.

According to an alternative approach, the reference data 54 is partitioned to a matrix of none-overlapping or overlapping sub-regions and each sub-region is separately signed by the private key of the sensor to create a digital signature. All sub-regions and the related signatures are transferred with the image metadata. In the event of a future crop operation made by a user, the corresponding sub-regions overlapping the discarded image data in the processed image are discarded 56 along with their signatures. The remaining sub-regions 55, with the corresponding signatures, are preserved for the remaining image authentication.

Exemplary embodiments of the present disclosure may be adapted for the authentication of audio files. Recorded audio authentication by digital signature has same fundamental difficulty as video since the audio may be processed and re-encoded so strict signature authentication might not be optimal. Thus, the above-described approaches may be readily adapted for the authentication of audio files. The audio recording may be divided into audio frames and each audio frame is compressed and encoded by the audio encoder to create a compressed reference audio file, which may have a higher degree of compression and/or a lower sample rate than the primary audio file and then each audio frame is digitally signed. These compressed reference audio frames are used as reference for the actual audio after further processing and modifications.

For the case of video file, in which authentication of the image frames has already been described, the related audio frames may be packed with the image frames, either by the application processor or by the image sensor if it includes an audio processing unit.

Figure 6:
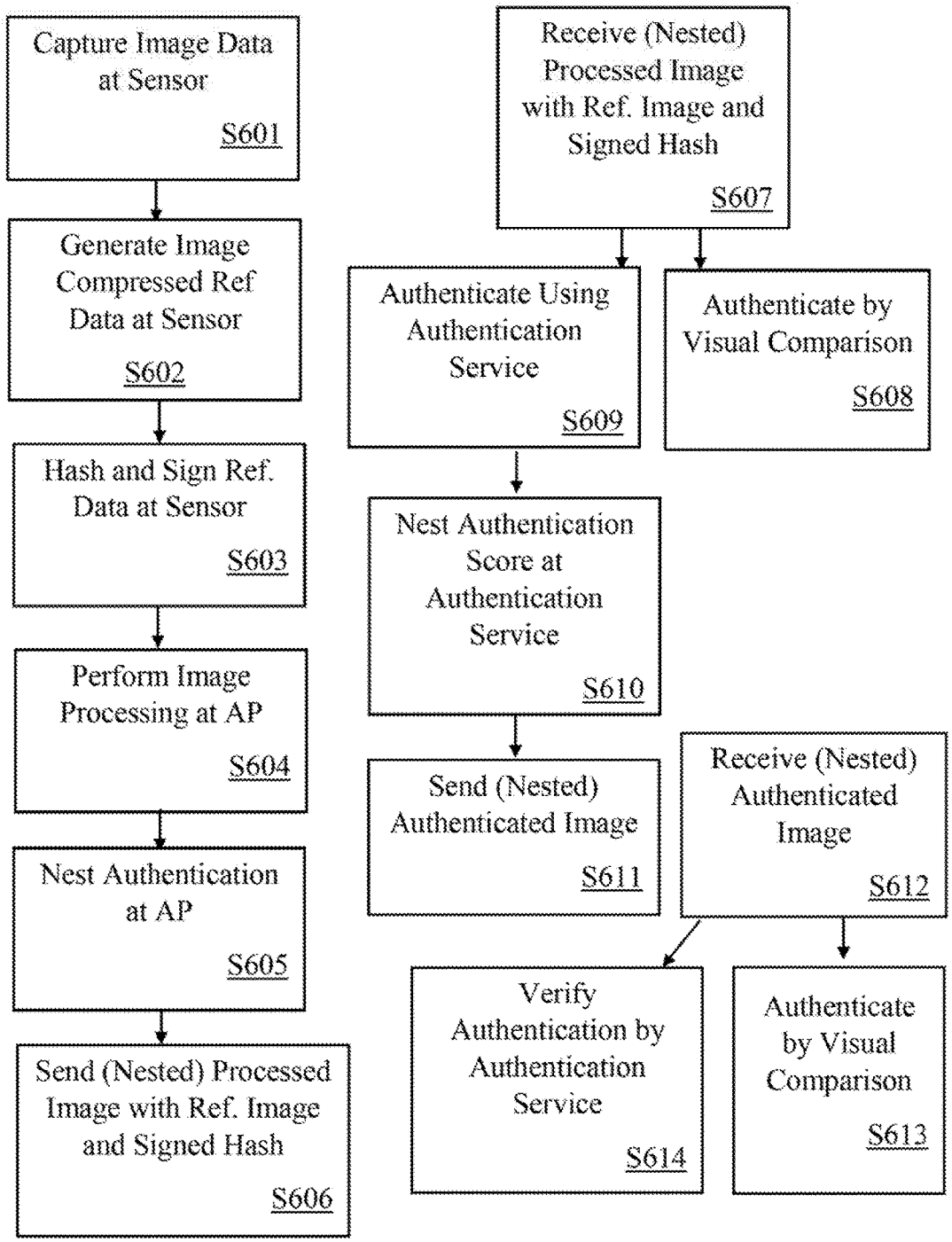
FIG. 6 is a flowchart illustrating an overview of the method for generating and authenticating an image in accordance with exemplary embodiments of the present disclosure.

FIG. 6 is a flowchart illustrating an overview of the method for generating and authenticating an image in accordance with exemplary embodiments of the present disclosure. As shown in this figure, first, an image may be captured by a sensor of a digital camera device (Step S601). Then, the compressed reference data may be generated from the captured image (Step S602). The compressed reference data may be hashed and signed (Step S603) and then the primary digital image, along with the compressed reference data and the signed hash may be passed along to the AP of the digital camera device where the AP performs image processing (Step S604). At this stage, the AP may chain the prior authentication within a new authentication so as to authenticate the processing and metadata provided by the AP along with the inclusion of the originally authenticated digital image data (Step S605). Thereafter, the signed digital image data may be sent (Step S606), for example, it may be made publicly available over the Internet. During this time, any number of edits, modifications, enhancements, etc. may be made to the primary digital image, but the compressed reference data and the signed hash may remain untouched.

The signed digital image data may thereafter be received (Step S607) and as the authenticity of this digital image data is not known to the recipient, the recipient may either perform authentication by visual comparison (Step S608), which may involve looking at both the primary digital image and the compressed reference data to view substantive similarity and to determine if any edits, modifications, enhancements, etc. made thereto would render the primary digital image inauthentic.

Alternatively, the recipient may invoke an authentication service which may algorithmically compare the primary digital image and the compressed reference data so as to provide a qualitative determination of authenticity, to provide a quantitative determination of authenticity for the entire image, and/or to provide a heat map showing level of authenticity for each section of the image so as to better help the recipient to understand the chances that the image has been manipulated on a section-by-section basis, where each section may be as small as a pixel or made of sub-regions that include a plurality of pixels (Step S609). The authentication service may then add to the chain of authenticity by signing the results of its analysis along with the remainder of the image data (Step S610). Thereafter, the authenticated image may again be sent out into the public, for example, over the Internet (Step S611).

Upon subsequent receipt (Step S612), the recipient may either perform the aforementioned visual authentication (Step S613) or may verify authenticity, without having to call the authentication service, by verifying the prior authentication made by the authentication service (Step S613).

Figure 7:
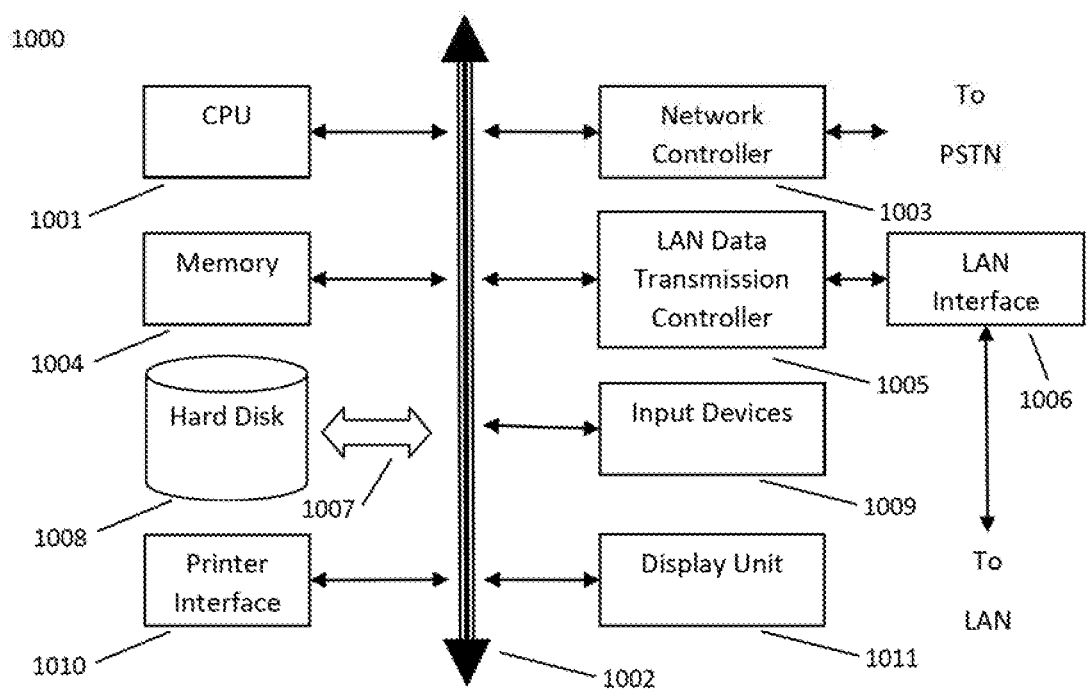
FIG. 7 shows an example of a computer system capable of implementing some methods according to embodiments of the present disclosure.

As discussed above, implementations of the generation of reference data and the digital signing may be performed by an image sensor of a digital camera and various other image processing aspects may be implemented by an AP of the digital camera. However, other aspects of the present disclosure, such as the implementation of the authentication system (and in some embodiments, the implementation of the AP) may be performed using a computer system. FIG. 7 shows an example of such a computer system. Here a software application may be running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for processing a digital image, comprising:
acquiring image data using an image sensor;
generating a compressed reference data from the acquired image data;
generating a hash of the compressed reference data using a hashing function;
signing the generated hash using an encryption function;
attaching the signed hash of the compressed reference data and the compressed reference data to a file of the acquired image data as metadata thereof;
transmitting the file of the acquired image data including the compressed reference data and the signed hash as metadata,
retrieving the compressed reference data and the signed hash from the metadata of the file of the acquired image and authenticating the retrieved compressed reference data based on the retrieved signed hash, and verifying the authenticity of the acquired image data based on visual similarities between the acquired image data and the authenticated retrieved compressed reference data, wherein the generating of the compressed reference data, the generating of the hash, and the signing of the hash are performed by the image sensor, wherein the image sensor is part of a digital camera device.

2. The method of claim 1, wherein the digital camera device further includes an application processor and the Image data, compressed reference data, and signed hash are received by the application processor and the image data is processed by the application processor m accordance with software running thereon.

3. The method of claim 2, wherein the compressed reference data is a first compressed reference data, and the application processor generates a second compressed reference data by concatenating second reference data obtained from one or more additional sensors, an additional scene, and/or user copyright data, generates a hash of the second compressed reference data, and signs the generated hash of the second compressed reference data to create a chain of authenticity.

4. The method of claim 1, further comprising:

receiving the file of the image data along with the compressed reference data and the signed hash attached thereto as metadata;

decrypting the signed hash using a decryption function to generate a decrypted hash value;

hashing the compressed reference data using the hashing function to generate a comparison hash value;

comparing the decrypted hash value to the comparison hash value to authenticate the signed hash; and when the signed hash has been authenticated, comparing the visual similarities between the image data and the authenticated compressed reference data to authenticate the image data.

5. The method of claim 4, wherein the encryption function utilizes a private key and the decryption function utilizes a public key associated with the private key.

6. The method of claim 4, wherein an authentication service compares the visual similarities between the image data and the authenticated compressed reference data to authenticate the image data.

7. The method of claim 6, wherein the authentication service signs a result of its comparison to create a chain of authenticity.

8. The method of claim 1, further comprising:

receiving the file of the image data along with the compressed reference data and the signed hash attached thereto as metadata;

editing the image data; and transmitting a file of the edited image data along with the compressed reference data and the signed hash attached thereto as metadata.

9. The method of claim 8, further comprising:

receiving the file of the edited image data along with the compressed reference data and the signed hash attached thereto as metadata;

decrypting the signed hash using a decryption function to generate a decrypted hash value;

hashing the compressed reference data using the hashing function to generate a comparison hash value;

comparing the decrypted hash value to the comparison hash value to authenticate the signed hash; and when the signed hash has been authenticated, comparing the visual similarities between the edited image data and the authenticated compressed reference data to assess an extent and position of the editing.

\* \* \* \* \*